US006802123B2

United States Patent
Soong

(10) Patent No.: US 6,802,123 B2
(45) Date of Patent: Oct. 12, 2004

(54) METHOD OF MANUFACTURING A ROLLING SHAFT OF A PHOTO PRINTER

(76) Inventor: Shin Soong, P.O. Box No. 6-57, Chung-Ho, Taipei 235 (TW)

( * ) Notice: Subject to any disclaimer, the term of this patent is extended or adjusted under 35 U.S.C. 154(b) by 164 days.

(21) Appl. No.: 10/147,470

(22) Filed: May 17, 2002

(65) Prior Publication Data

US 2003/0213126 A1 Nov. 20, 2003

(51) Int. Cl.[7] ................................. B23P 15/00
(52) U.S. Cl. ................ 29/895.32; 29/895.21; 492/56
(58) Field of Search ............... 29/895.32, 895.21, 29/895.22, 895.3; 492/56

(56) References Cited

U.S. PATENT DOCUMENTS

| 5,138,766 | A | * | 8/1992 | Kimura et al. ......... 29/895.212 |
| 5,585,909 | A | * | 12/1996 | Behe et al. .................. 399/324 |
| 5,993,952 | A | * | 11/1999 | Cox et al. ................. 428/305.5 |
| 6,006,663 | A | * | 12/1999 | Kropp et al. ................ 101/216 |
| 6,219,510 | B1 | * | 4/2001 | Ando et al. .................. 399/176 |
| 6,491,613 | B2 | * | 12/2002 | Takeda et al. ................. 492/59 |
| 2002/0015546 | A1 | * | 2/2002 | Bhagavatula et al. ......... 385/10 |
| 2002/0086782 | A1 | * | 7/2002 | Borger et al. ................. 492/56 |
| 2003/0191000 | A1 | * | 10/2003 | Park ............................ 492/56 |

* cited by examiner

Primary Examiner—Irene Cuda Rosenbaum

(57) ABSTRACT

A method of manufacturing a rolling shaft of a photo printer mainly has two rubber casings sleeved at two ends of a long cylindrical rod which is then placed horizontally; after that, the long cylindrical rod is sprayed with a layer of resin thereby forming an rubber wheel at the central position of the long cylindrical rod; finally, the rubber wheel is adhered with a layer of fine grain material with high coefficient of abrasion such that the rolling shaft has a preferred abrasiveness and causes no chemical reaction with the photo paper.

1 Claim, 4 Drawing Sheets

METHOD OF MANUFACTURING A ROLLING SHAFT OF A PHOTO PRINTER

BACKGROUND OF THE INVENTION

1) Field of the Invention

The present invention relates to a method of manufacturing a rolling shaft of a photo printer, more especially to a method of manufacturing a rolling shaft for transporting photo paper in a photo printer, wherein a long cylindrical rod is first sprayed with a thin film of resin to form a rubber wheel and then adhered with a layer of abrasion resistant material (for example, the porcelain powder) in irregular shapes on the surface thereof; finally, another layer of resin is sprayed on to securely cover the abrasion resistant material within the layer of resin. The irregular shapes of the abrasion resistant material make the rolling shaft have a preferred abrasiveness; furthermore, the resin material is steady, pure and causes no chemical reaction with the photo paper.

2) Description of the Prior Art

Accordingly, the rolling shaft of a conventional photo printer used for transporting photo paper usually has a long cylindrical rod molded through injection to form a rubber wheel made of rubber material. However, with complicate chemical ingredients and the constant property changes due to the variation of temperature and time, the rubber wheel tends to cause chemical reaction on the contacted surface of the photosensitive photo paper and the chemical substance thereon for developing images, thereby resulting in the occurrence of color difference in the image printed on the photo paper or the adhesion between the photo paper and the rolling shaft.

Furthermore, since the abovementioned conventional rolling shaft of a rubber wheel is molded through injection in a molding die, two joint lines usually appear on the circumferential plane of the rubber wheel. Therefore, after molding the rubber wheel through injection, it is necessary to smooth or cut for removing the joint lines; that not only increases the manufacturing labor time and cost, but also is inconvenient for processing.

In view of the abovementioned shortcomings of using and manufacturing the rubber made rolling shaft for transporting photo paper, the inventor of the present invention researched and designed an innovative method of manufacturing a rolling shaft of a photo printer.

SUMMARY OF THE INVENTION

The present invention mainly comprises two rubber casings sleeved at two ends of a long cylindrical rod; after being placed horizontally, the long cylindrical rod is then sprayed with a layer of resin thereby forming a thin film rubber wheel at the central position of the long circular rod; then a layer of abrasion resistant fine grain material (for example, the porcelain powder) is adhered to the surface of the rubber wheel; finally, another layer of resin is sprayed on; after this layer dries out, the rubber casings are removed thereby conveniently accomplishing the manufacture of the rolling shaft of the photo printer.

Therefore, the primary objective of the present invention is to provide a rolling shaft of a photo printer for transporting photo paper, wherein a rubber wheel of a long circular rod is sprayed with resin having steady and pure ingredients as well as causing no chemical reaction with the contacted photo paper; furthermore, it is adhered with a layer of abrasion resistant fine grain material in irregular shapes to rough the surface of the rolling shaft for having a preferred transmitting abrasiveness; in addition, it does not cause chemical reaction with the contacted photo paper thereby enhancing the printing quality.

To enable a further understanding of the structural features and the technical contents of the present invention, the brief description of the drawings below is followed by the detailed description of the preferred embodiment.

DETAILED DESCRIPTION OF THE PREFERRED EMBODIMENTS

Figure 1:
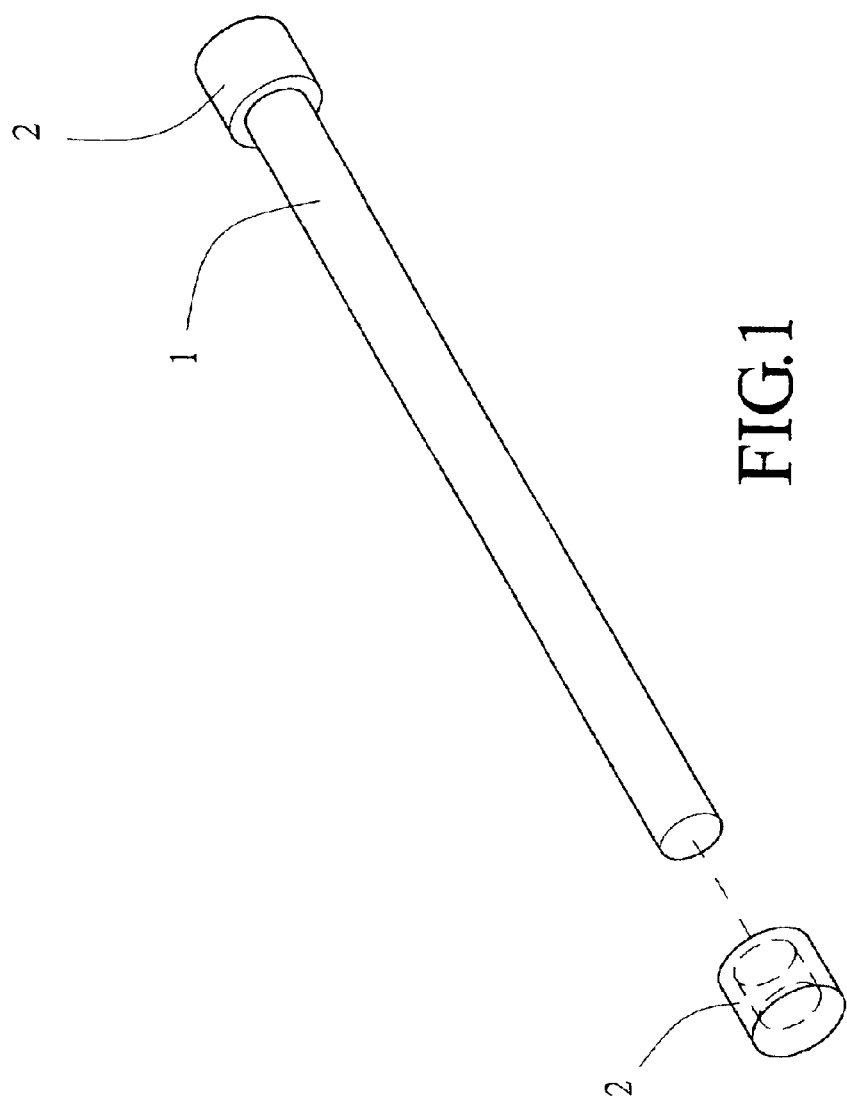
FIG. 1 is a pictorial and exploded drawing of a long cylindrical rod and rubber casings of the present invention.
Figure 2:
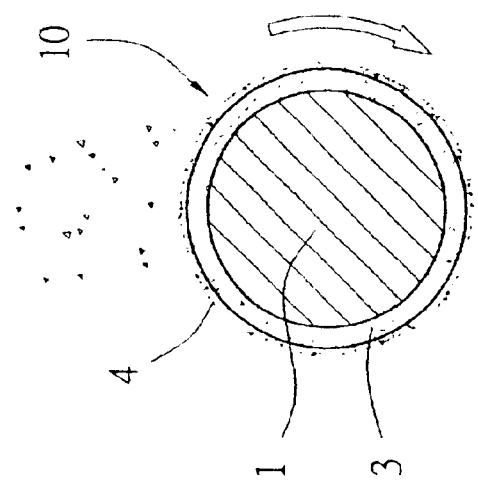
FIG. 2 is a schematic drawing of spraying resin onto the long cylindrical rod to form a rubber wheel of the present invention.

Referring to FIGS. 1 to 4, the present invention comprises the following procedures:

(a) To sleeve rubber casings (2) at two ends of a long cylindrical rod (1) for maintaining the diameter size of the two ends thereof and facilitating the follow-up processing, as shown in FIG. 1;

(b) To spray a layer of thin film of resin (31) with even thickness onto the long cylindrical rod (1) to form a layer of rubber wheel (3) at the central position of the long cylindrical rod (1), as shown in FIG. 2.

Figure 3:
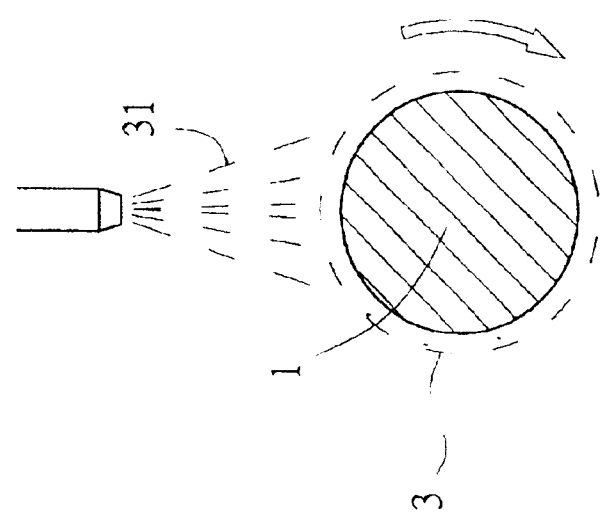
FIG. 3 is a schematic drawing of adhering a fine grain material onto the surface of the rubber wheel of the present invention.

(c) To adhere a layer of abrasion resistance fine grain material (substance such as the porcelain powder, metal powder, etc.) on the rubber wheel (3) surface of the long cylindrical rod (1) before the rubber wheel (3) dries out such that the irregular surface of the fine grain powder material (4) and the adhesive state make the surface of a rolling shaft (10) have high efficient abrasiveness, as shown in FIG. 3.

Figure 4:
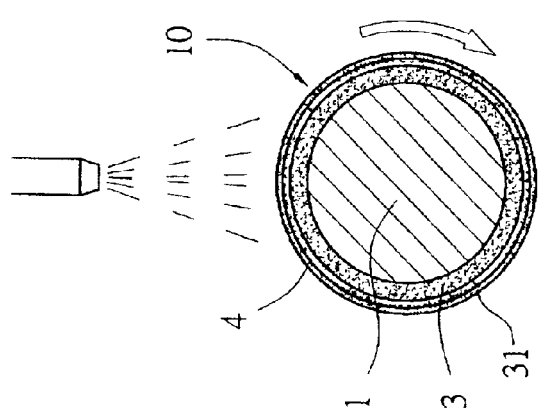
FIG. 4 is a schematic drawing of spraying a layer of protective resin film on the surface of the rubber wheel of the present invention.
Figure 5:
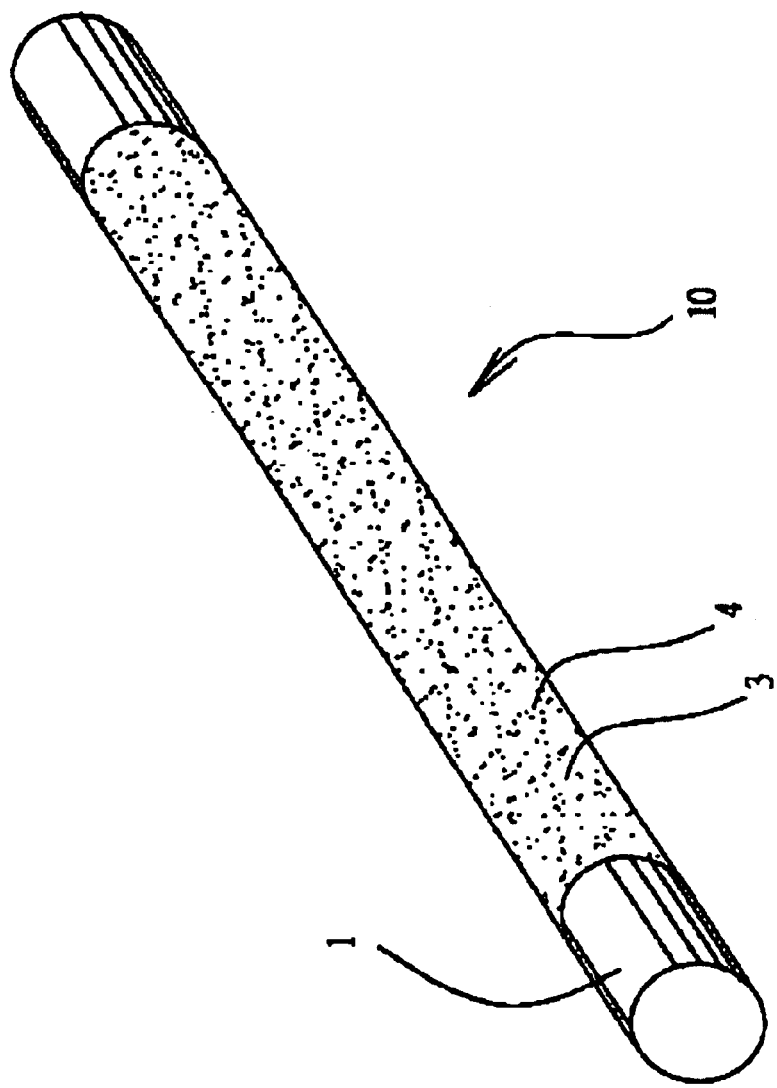
FIG. 5 is a schematic drawing showing the finished product of a rolling shaft In longitudinal view with rubber casings removed.

(d) To spray a layer of thin film of resin (31) with even thickness onto the surface of the long cylindrical rod (1) adhered with fine grain material to form a protective film such that the resin (31) layer securely covers the fine grain material (4) therein to prevent it from exfoliating in application; after the sprayed resin (31) dries out, the two rubber casings (2) are removed to finish manufacturing the rolling shaft (10), as shown In FIG. 4, and FIG. 5.

According to the abovementioned manufacturing method, since the chemical ingredients of the rubber wheel (3) on the long cylindrical rod (1) is of steady and pure resin material, when the photo paper presses on the rolling shaft (10) for transportation, the chemical reaction generated by the direct contact between the surface of the rubber wheel (3) and the photo paper is eliminated so as to protect printing quality and obtain a preferred application efficiency.

Furthermore, on the rubber wheel (3), a layer of abrasion resistant fine grain material (4) in irregular shapes is covered between two layers of resin (31) to make the surface of the rubber wheel (3) have preferred abrasiveness to facilitate photo paper transportation.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A method of manufacturing the rolling shaft of a photo printer comprising steps of:

(a) sleeveing rubber casings at two ends of a long cylindrical rod;

(b) spraying a layer of thin film of resin onto the long cylindrical rod thereby forming a rubber wheel at the central position of the long cylindrical rod;

(c) adhereing a layer of abrasion resistance fine grain material on the rubber wheel surface of the long cylindrical rod;

(d) spraying a layer of thin film of resin onto the surface of the long cylindrical rod adhered with fine grain material; after the sprayed resin dries out, the two rubber casings are removed to finish manufacturing the rolling shaft.

* * * * *